United States Patent

[11] 3,617,563

| [72] | Inventor | Kaj O. H. Fuxelius |
| | | Billingsfors, Sweden |
| [21] | Appl. No. | 849,499 |
| [22] | Filed | Aug. 12, 1969 |
| [45] | Patented | Nov. 2, 1971 |
| [73] | Assignee | Research Ab |
| | | Sundbyberg, |
| [32] | Priority | Aug. 19, 1968 |
| [33] | | Sweden |
| [31] | | 11,151/68 |

[54] PROCESS AND A PRODUCT FOR THE PURIFICATION OF POLLUTED WATER FROM HEAVY METAL IONS PRESENT THEREIN
6 Claims, No Drawings

[52] U.S. Cl. .................................................... 210/38,
260/2.2 R
[51] Int. Cl. ....................................................... C08g 23/10,
B01d 15/04
[50] Field of Search ........................................ 260/2.2,
17.5; 210/38

[56] References Cited
UNITED STATES PATENTS
| 3,226,380 | 12/1965 | Knight .......................... | 260/212 |
| 3,275,576 | 9/1966 | Flodin et al. .................. | 260/2.2 |

OTHER REFERENCES

Helfferich, Ion Exchange, McGraw-Hill, New York 1962 (p. 46). Stanisheyskaya, Bumazh. Prom. 36, No. 6, 7– 8 (1961)

Mikhailov et al., Izv. Inst. po Obscha Neorg. Khim., Org. Khim. Bulgar. Akad. Nauk 9, 187– 196 (1962).

*Primary Examiner*—Melvin Goldstein
*Attorney*—Sommers & Young

ABSTRACT: A product for the pruification of polluted water from heavy metal ions such as lead and mercury, present therein. The process is characterized by treating the water with an ion exchange composition on the basis of epoxidized black liquor obtained from the sulfate pulp process. The product as used for this pruification may be a reaction product of (a) black liquor, (b) epichlorohydrin or 1,2 !-dichlorohydrin and if desired (c) a thiol compound

PROCESS AND A PRODUCT FOR THE PURIFICATION OF POLLUTED WATER FROM HEAVY METAL IONS PRESENT THEREIN

The present invention relates to a process and a product for the purification of polluted water from heavy metal ions, principally lead and mercury, present therein.

During the last years the contents of mercury in the watercourses have been noticed, principally in view of the high contents of mercury in fish which has caused fish from certain lakes in some countries to be forbidden as human food. This serious problem has arisen due to mercury-containing pollutions of, for example, waste water from industries, principally from the chlorine-alkali industry but also from pulp factories and paper mills where organic mercury compounds are used for the preservation of paper pulp and control of slime forming in paper mills. Also the preparation and use of germicides for agricultural purposes has caused poisoning of the watercourses.

In the chlorine-alkali industry, the mercury process is often used for the preparation of chlorine and alkali. An investigation has indicated that chlorine factories lose mercury in an amount of 100–130 grams per ton of produced chlorine in this process. By means of more careful control of the process, this mercury loss may be reduced, but this control may be very expensive in older factories. However, it has proved to be difficult with the presently used active carbon filters and ion exchangers to remove remainders of mercury in the waste waters. It has also been attempted to eliminate the mercury pollution by means of processes where sodium sulfide is added to the water and mercury sulfide is precipitated and flocculated with ferric chloride. Such processes, however, need more and careful attendance and there are problems with the sludge treatment. The capital investments in plants for carrying out this process are high and thereto the costs for the continuous adding of chemicals must be considered. Other methods, such as addition of enrichment sludge, have been investigated but have proved to be unsatisfactory.

The present invention relates to a novel process where heavy metal ions, principally mercury ions, are absorbed from the polluted or "poisoned" water by means of an ion exchanger based on epoxidized black liquor. Black liquor is the waste liquor from the digestion of wood in the sulfate pulp process. It is previously known per se that mercury may be absorbed on cation exchangers of inorganic or organic type. Such an ion exchanger has poor selectivity for heavy metal ions and would be saturated rapidly by other cations such as $Na^+$, $Ca^{2+}$ etc., and then the ion exchanging capacity would cease.

The ion exchanger as used according to the invention is selective for mercury and other heavy metal ions and is the reaction product of (a) black liquor from the sulfate pulp process, (b) epichlorohydrin or 1,2-dichlorohydrin and if desired (c) a thiol.

The lignine of the black liquor contains ion exchange groups. These groups have the ability to bind heavy metal ions very strongly. The black liquor however must be converted into an insoluble form. In order that the black liquor be obtained in a nonwater-soluble form it must be reacted with epoxides which inter alia react with hydroxyl groups. According to the present invention, epichlorohydrin has been advantageously used. It is previously known per se that the cross-linking of sulfate lignine may be carried out by addition of sodium hydroxide and epichlorohydrin for the preparation of lignine resins. In this connection, see "Wood Chemistry" by Jahn Wise, 2nd edition, Reinhold Publishing Corp. 1952, page 439 and pages 489–491. However, it has been found that the cross-linking may be effected by the contents of alkali in the black liquor in the form of sodium sulfide; this provides the advantage that the ion exchanger will contain a higher proportion of sulfur, and due to this higher content of sulfur in the form of thiol groups it will have a higher ion exchange capacity. The proportion of thiol groups in the ion exchanger may also be increased by coupling to the lignine of the black liquor thiol groups derived from preferably water-soluble thiol compounds or alkali metal sulfides, the coupling being effected by means of epichlorohydrin or 1,2-dichlorohydrin.

When mercury-containing water is passed through an ion exchanger according to the present invention where the lignine component of the black liquor has been rendered insoluble in water, mercury and heavy metal ions such as lead and copper are bound very firmly to the resin, irrespective of whether or not other ions are present in high concentration. Nor is the capacity of the ion exchanger reduced by passage of e.g. alkali ions therethrough. The capacity of the ion exchanger to absorb heavy metal ions has proved to be unexpectedly high.

It is possible for the preparation of the ion exchanger to take the black liquor directly from the black liquor evaporator in the cellulose factory and react it with epichlorohydrin. The reaction takes place slowly already at room temperature but the reaction rate increases at higher temperatures. The reaction may thus be carried out within a wide temperature range from room temperature up to 130° C. but advantageously the reaction has been carried out between 50° to 100° C.

The amount of epichlorohydrin as calculated on black liquor solids should preferably be 5–20 percent by weight. The concentration of black liquor, which is a water solution of lignine and a variety of different chemicals, may be varied from about 5 to about 90 percent but it is advantageous for the reaction to use a concentration of 50–80percent. By the reaction, the reaction mass is converted to a solid state. The solid reaction product is then washed and ground and is screened to suitable grain size so as to make it useful as an ion exchanger in an ion exchanger bed. Experiments have been made with good results to use the ion exchanger both in columns and as additives directly to poisoned water.

In some of the practical preparative work effected, the ion exchanger mass was ground to a very fine powder that was slurried in a $4\times10^{13}$M solution of mercury chloride whereupon the mass was filtered off. In the filtrate no mercury could be detected; the powder could thus be used for continuous dosage to mercury-containing water pollutions or for purification of poisoned watercourses. For a mercury content of about $3\times10^{19}$ grams/grams of water, theoretically 1 kg. of ion exchanger mass should be required to purify 20,000,000 liters of water. Owing to the powder's being heavier than water, it gradually will sink to the bottom. Due to the very firm bond of the mercury to the ion exchanger mass the risk is small that the mercury will be converted biologically and be absorbed by the bottom fauna. In the ion exchanger bed experiments, a grain size of 0.4–0.6 mm. was suitably used. In the experiments with continuous dosage to waste waters or lakes, the mass was used in finely ground form.

The pollution from chlorine-alkali factories contains in some cases mercury in colloidal form (metal). As only mercury in the form of ions can be absorbed on the ion exchanger the mercury must be oxidized. Experiments have proved that this can be easily done by addition of very small amounts of chlorine gas (1–10p.p.m.) at pH 7; alternatively sodium hypochlorite can be added. The oxidation may also be brought about by passing the water after acidifying to a pH of about 3 through a bed of lead dioxide. It is important that the ion exchanger mass is not subjected to the action of strongly oxidizing compounds. Excess of chlorine gas may be removed by e.g. active carbon.

The invention will be further illustrated in the following examples which however do not restrict the scope of invention.

Example 1

One-thousand grams of black liquor concentrated to a dry substance content of about 60 percent, are mixed with 100 grams of epichlorohydrin with stirring at a temperature of 90° C. After a reaction time of 1–3 minutes the ion exchanger mass forms a precipitate consisting of hard brown lumps. After having been crushed to a grain size of 2–3 mm. the mass is washed with hot water and is dried at 110° C. The mass is then finely ground and the fraction 0.4–0.6 mm. is screened off. A conventional ion exchanger tube is filled with the mass slurried in water, whereupon water containing 5 mg. $Hg^{2+}/l$ is passed through the bed. The eluate thus obtained was analyzed for mercury with dithizone (sensitivity about 0.1 mg. $Hg^{2+}/1a0$). At a charge of 5 ml./cm.$^2$–min. through the bed, no mercury could be detected in the first 100 liters of effluent from the bed. After passage of 100 liters the mercury absorption efficiency was about 98 percent and then it sank slowly continuously after 150 liters.

Example 2

For the preparation of an ion exchanger mass as described in example 1 epichlorohydrin was replaced by 1,2-dichlorohydrin while all the other conditions were the same. Water containing 5 mg. $Pb^{2+}/l$ was passed through a tube containing the mass thus obtained. The results obtained were the same as those in example 1.

Example 3

Four-hundred grams of black liquor concentrated to a dry substance content of 60 percent were mixed with 40 grams of epichlorohydrin at room temperature. The temperature was thereafter raised to 80° C.; at this temperature the reaction between epichlorohydrin and thiolignine started. The temperature rose rapidly to 110° C. this rise in temperature being accompanied by a considerable expansion of the mixture. After about 3 minutes the mass congealed to form a porous coherent lump. The mass was somewhat elastic but became gradually hard. The mass was crushed, to form coarse fragments, washed and dried at 100° C. and then it was finely ground in an electric coffeemill. The yield was 75 percent as calculated on the dry substance. The fraction 0.4–0.8 mm. was screened off and was used in the ion exchange experiments. A conventional ion exchange tube, having a length of 1,100 mm. and a diameter of 25 mm. was filled to a bed level of 1,000 mm. with the above mass. Through the bed a solution of $1.85 \times 10^{15}$M mercury chloride was passed in a flow of 10 bed volumes per hour. After 370 liters, mercury began to leak out.

Example 4

In this example the same proportion between black liquor and epichlorohydrin as in example 3 was used. The mixture was heated in a closed steel cylinder to 80° C., whereupon the temperature quickly rose to 110° C. (the measurement was carried out with a thermistor placed in the mixture). After 10 minutes the steel cylinder was cooled and the reaction product was taken out. The mass thus obtained (contrary to that obtained in example 3) did not to any substantial extent contain voids or entrapped gas bubbles, and therefore the density of the mass was higher. In an ion exchange experiment run as in example 3 the ion exchanger was saturated after 450 liters of a $1.85 \times 10^{10h5}$M lead nitrate solution had been passed therethrough.

Example 5

In this example the same proportion between black liquor and epichlorohydrin as in examples 3 and 4 was used, but the temperature was raised only to 60° C. whereupon the mixture was continuously cooled with circulating cooling water. The mixture congealed gradually and after 30 minutes the mixture was hard. No formation of voids or entrapped bubbles occurred in the material. In the ion exchange operation according to example 3 the mass was saturated after 420 liters.

Example 6

Four-hundred grams of black liquor concentrated to a dry substance content of 60 percent were mixed at room temperature with 100 grams of epichlorohydrin. Upon heating to 80° C. with stirring, 1–2 mm. hard particles precipitated. After filtering and washing the mass was directly used as an ion exchanger according to example 3. A $1.85 \times 10^{15}$ M solution of mercury (II) chloride was passed through the column. After about 75 liters, mercury began to leak out (analysis by the dithizone method).

Example 7

Five-hundred grams of black liquor concentrated to a dry substance content of 80 percent were mixed with 70 grams of epichlorohydrin after the black liquor had been heated to 40° C. The temperature was progressively raised to 80° C. whereupon the temperature rose to 110° C. The mass precipitated in the form of a solid lump which was ground and washed. In an ion exchange operation as in example 3, the mass was saturated after 362 liters.

Example 8

Four-hundred grams of black liquor concentrated to a dry substance content of 60 percent were mixed at room temperature with 50 grams of epichlorohydrin and 5 grams of 1,3-dithiopropane. After reaction according to the preceding example the mass was washed and ground. In an ion exchange operation according to example 3, the mass was saturated after 600 liters.

In the following table the results of examples 3–8 are summarized.

Table

| Example | Conc. black liquor, % | Amount of epichlorohydrin, % by weight | Temp. °C. | Capacity m eqv./g. |
| --- | --- | --- | --- | --- |
| 3 | 60 | 10 | 80 | 0.14 |
| 4 | 60 | 10 | 80 | 0.15 |
| 5 | 60 | 10 | 60 | 0.13 |
| 6 | 60 | 25 | 80 | 0.04 |
| 7 | 80 | 14 | 80 | 0.14 |
| 8 | 60 | 12.5 | 80 | 0.22 |

Regeneration of an ion exchanger saturated with mercury may be carried out by addition of a saturated solution of sodium chloride at pH 1–3. The metals bound in these ion exchangers may also be recovered by wet combustion with nitric acid.

I claim:

1. A process for removal of heavy metal ions from polluted water, comprising treating the water with an ion exchanger mass consisting essentially of a reaction product of (a) an aqueous sulfate black liquor of 5–90 percent solids content and (b) 5–20 percent by weight, based on black liquor solids, or a compound selected from the group consisting of epichlorohydrin and 1,2-dichlorohydrin.

2. A process according to claim 1, characterized in that the heavy metal ions are selected from the group consisting of mercury and lead.

3. A process for the removal of heavy metal ions from polluted water, comprising treating the water with an ion exchanger mass consisting essentially of a reaction product of (I) a major amount of components (a) and (b), said component (a) being an aqueous sulfate black liquor of 5–90 percent solids content and said component (b) being 5–20 percent by weight, based on black liquor solids, of a compound selected from the group consisting of epichlorohydrin and 1,2-dichlorohydrin and (II) a minor amount of 1,3-dithiopropane.

4. A process according to claim 3, characterized in that the heavy metal ions are selected from the group consisting of mercury and lead.

5. An ion exchanger mass for the removal of heavy metal ions from polluted water, consisting essentially of a reaction product of (a) an aqueous sulfate black liquor of 5–90 percent solids content and (b) 5–20 percent by weight, based on black liquor solids, of a compound selected from the group consisting of epichlorohydrin and 1,2-dichlorohydrin.

6. An ion exchanger mass for the removal of heavy metal ions from polluted water, consisting essentially of a reaction product of (I) a major amount of components (a) and (b), said component (a) being an aqueous sulfate black liquor of 5–90 percent solids content, and said component (b) being 5–20 percent by weight, based on black liquor solids, of a compound selected from the group consisting of epichlorohydrin and 1,2-dichlorohydrin, and (II), a minor amount of 1,3-dithiopropane.

* * * * *